United States Patent
Tukker et al.

(10) Patent No.: US 7,701,832 B2
(45) Date of Patent: Apr. 20, 2010

(54) OPTICAL RECORD CARRIER SCANNING DEVICE

(75) Inventors: Teunis Willem Tukker, Eindhoven (NL); Joris Jan Vrehen, Eindhoven (NL)

(73) Assignee: CP-Mahk Japan Co., Ltd., Yamagata (JP)

( * ) Notice: Subject to any disclaimer, the term of this patent is extended or adjusted under 35 U.S.C. 154(b) by 688 days.

(21) Appl. No.: 10/599,069

(22) PCT Filed: Mar. 16, 2005

(86) PCT No.: PCT/IB2005/050918

§ 371 (c)(1),
(2), (4) Date: Sep. 19, 2006

(87) PCT Pub. No.: WO2005/093735

PCT Pub. Date: Oct. 6, 2005

(65) Prior Publication Data

US 2007/0206469 A1    Sep. 6, 2007

(30) Foreign Application Priority Data

Mar. 24, 2004  (EP) ................................. 04101208

(51) Int. Cl.
*G11B 7/00* (2006.01)
(52) U.S. Cl. .............................. 369/112.06; 369/44.23; 369/112.03; 369/112.07
(58) Field of Classification Search .................. None
See application file for complete search history.

(56) References Cited

U.S. PATENT DOCUMENTS 6,687,037 B2    2/2004 Hendriks et al.

2004/0047269 A1    3/2004 Ikenaka et al.

FOREIGN PATENT DOCUMENTS

| WO | WO0241307 A1 | 5/2002 |
| WO | WO03006891 A2 | 7/2003 |
| WO | WO03060892 A2 | 7/2003 |
| WO | WO2005093735 A1 | 10/2005 |

OTHER PUBLICATIONS

Bouwhuis, J. et al; "Principles of Optical Disc Systems"; (Adam Hilger Ltd, 1995);pp. 70-73,75-80.

*Primary Examiner*—Jorge L Ortiz Criado
(74) *Attorney, Agent, or Firm*—McDermott Will & Emery LLP

(57) ABSTRACT

An optical scanning device scans optical record carriers, such as three optical record carriers, where each optical record carrier has an information layer having a depth which is different from the information layer depth of other optical record carriers, where $d_3 < d_2 < d_1$, and where $d_1$, $d_2$, $d_3$ are the information layer depths of the first, second, and third optical record carriers, respectively. The scanning device includes a radiation source system for producing three radiation beams of different wavelengths for scanning the three record carriers. The scanning device further includes a diffraction structure for introducing three different wavefront modifications into the three radiation beams, respectively. The diffraction structure is arranged to operate at selected diffraction orders $m_1$, $m_2$, $m_3$, for the three radiation beams, respectively. The diffraction structure is arranged such that the following relation holds:

$$-1 < \frac{(m_3 - m_2)}{(m_2 - m_1)} - \frac{(d_3 - d_2)}{(d_2 - d_1)} < 1$$

29 Claims, 12 Drawing Sheets

OPTICAL RECORD CARRIER SCANNING DEVICE

FIELD OF THE INVENTION

The present invention relates to an optical scanning device for scanning optical record carriers having information layers at different information layer depths.

BACKGROUND OF THE INVENTION

The field of data storage using optical record carriers is currently an intensively researched area of technology. Many such optical record carrier formats exist including compact discs (CD), conventional digital versatile discs (DVD) and Blu-ray discs (BD). These formats are available in different types including read-only versions (CD-ROM/DVD-ROM/BD-ROM), recordable versions (CD-R/DVD-R/BD-R), re-writeable versions (CD-RW/DVD-RW/BD-R) and audio versions (CD-A). For scanning the different formats of optical record carrier it is necessary to use a radiation beam having a different wavelength. This wavelength is approximately 780 nm for scanning a CD, approximately 650 nm for scanning a DVD and approximately 405 nm for scanning a BD.

Different formats of optical disc are capable of storing different maximum quantities of data. This maximum quantity is related to the wavelength of the radiation beam which is necessary to scan the disc and a numerical aperture (NA) of the objective lens. Scanning can include reading and/or writing of data on the disc.

The data on an optical disc is stored on an information layer. The information layer of the disc is protected by a cover layer which has a predetermined thickness. Different formats of optical disc have a different thickness of the cover layer, for example the cover layer thickness of CD is approximately 1.2 mm, DVD is approximately 0.6 mm and BD is approximately 0.1 mm. When scanning an optical disc of a certain format, the radiation beam is focused to a point on the information layer. As the radiation beam passes through the cover layer of the disc a spherical aberration is introduced into the radiation beam. An amount of introduced spherical aberration depends on the thickness of the cover layer and the wavelength of the radiation beam. Prior to reaching the cover layer of the disc the radiation beam needs to already possess a certain spherical aberration such that in combination with the spherical aberration introduced by the cover layer, the radiation beam may be correctly focused on the information layer of the disc. For scanning different discs with different cover layer thicknesses, the radiation beam needs to possess a different spherical aberration prior to reaching the cover layer. This ensures correct focusing of the radiation beam on the information layer It is desirable to have one optical device which is capable of scanning many different formats of disc, for example CD, DVD and BD. Such devices are often relatively difficult to design. This is in part because different cover layer thicknesses require a different spherical aberration of the appropriate radiation beam prior to reaching the cover layer. Such multiple disc format scanning devices often include an assembly of many different optical elements which are individually specific for the scanning of only one optical disc. This often makes such devices relatively complex and consequently bulky and expensive.

International patent application WO 03/060891 describes an optical scanning device for scanning an information layer of three different optical record carriers using, respectively, three different radiation beams. Each radiation beam has a polarisation and a different wavelength. The device comprises an objective lens having a diffractive part which comprises birefringent material. The diffractive part diffracts the radiation beams such that the beam with the shortest wavelength has an introduced phase change modulo $2\pi$ of substantially zero for the shortest wavelength. The diffractive part diffracts at least one of the other radiation beams into a positive first order.

International patent application WO 03/060892 describes an optical scanning device for scanning an information layer of three different optical record carriers using, respectively, three different radiation beams. Each radiation beam has a polarisation and a different wavelength. The device comprises an objective lens and a phase structure for compensating a wavefront aberration of one or two of the radiation beams. The phase structure comprises birefringent material and has a non-periodic stepped profile.

U.S. Pat. No. 6,687,037 describes an optical scanning device for scanning optical record carriers with radiation beams of two different wavelengths. The device comprises an objective lens and a diffractive element having a stepped profile which approximates a blazed diffraction grating. The diffractive element selects a zeroth diffraction order for the radiation beam of the shortest wavelength, and selects a first order for the other radiation beam.

International patent application WO 02/41307 describes a lens system for use in an optical scanning device. In this system, a radiation beam is used to scan an information layer of an optical record carrier. A lens of the system has both a diffractive grating and a phase structure having a non-periodic stepped profile. This lens reduces a sensitivity of the lens system to variations in the wavelength of the radiation beam and to variations of environmental temperature.

SUMMARY OF THE INVENTION

It is an object of the present invention to provide an efficient optical scanning device for scanning optical record carriers having at least three different information layer depths, with radiation beams of different wavelengths.

In accordance with one aspect of the present invention, there is provided an optical scanning device for scanning optical record carriers having information layers at different information layer depths within the carrier, the optical record carriers including a first optical record carrier having an information layer at a first information layer depth $d_1$, a second optical record carrier having an information layer at a second information layer depth $d_2$ and a third optical record carrier having an information layer at a third information layer depth $d_3$, wherein $d_3 < d_2 < d_1$, the scanning device including a radiation source system for producing first, second and third radiation beams, for scanning said first, second and third record carriers, respectively, the device including a diffraction structure introducing first, second and third, different, wavefront modifications into at least part of the first, second and third, radiation beams, respectively, the diffraction structure being arranged to operate at selected diffraction orders $m_1$, $m_2$, $m_3$, for the first, second and third radiation beams, respectively, characterised in that the diffraction structure is arranged such that the following relation holds:

$$-1 < \frac{(m_3 - m_2)}{(m_2 - m_1)} - \frac{(d_3 - d_2)}{(d_2 - d_1)} < 1$$

By arranging the diffraction structure in accordance with the above relation, an optical scanning device is provided which is capable of efficiently scanning the information layer of the first, second and third optical record carriers with radiation beams of different wavelengths.

In contrast to optical scanning devices of the prior art for scanning three different optical disc formats, the diffraction structure of the present invention need not be manufactured from a birefringent material. This provides relative simplicity and a relatively low cost of manufacture for the optical scanning device.

There is no need for one or more of the radiation beams to have a predefined polarisation. This adds to the simplicity and the relatively low cost of manufacture. Further, with the optical scanning device not requiring polarisation of the radiation beams to scan the different optical record carriers, polarisation of the radiation beams may be utilised in a different feature of the optical scanning device. The optical scanning device is therefore provided with an additional degree of design freedom.

Preferably the optical scanning device comprises an adaptation structure arranged to introduce a non-diffraction adaptation component into each radiation beam, wherein the non-diffraction adaptation component is arranged to at least partly compensate spherical aberration.

Preferably the optical scanning device has an optical axis and comprises a non-periodic phase structure arranged to introduce a non-periodic phase component into each radiation beam, wherein said non-periodic phase structure comprises a plurality of radial zones arranged concentrically about said optical axis and having a non-periodic profile.

With the non-periodic phase structure being arranged to introduce the non-periodic phase component into each radiation beam, rather than into only certain of the radiation beams, the design of the optical scanning device is further simplified.

In accordance with another aspect of the present invention, there is provided an optical system for introducing first, second and third, different, wavefront modifications into at least part of first, second and third, radiation beams, respectively, each said radiation beam having a different predetermined wavelength, the wavelength of said third radiation beam being shorter than the wavelength of both said first and said second radiation beam, wherein said optical system comprises a diffraction structure having a profile which varies in steps which are arranged to provide selected diffraction components in said wavefront modifications, the selected diffraction component of said first wavefront modification being a diffraction component of a non-zero order, characterised in that:

i) the diffraction structure is arranged such that the selected diffraction component of said third wavefront modification is a diffraction component of a non-zero order; and in that ii) the steps of the profile of the diffraction structure are arranged to introduce into said second radiation beam phase changes, each phase change, modulo $2\pi$, being substantially equal to each other phase change.

For the second radiation beam, an average phase change value, modulo $2\pi$, can be determined by taking an average of the phase changes across all steps of the diffraction structure. A difference between each phase change and the average phase change value, modulo $2\pi$, is substantially zero. It should be understood that, preferably, each difference is less than $0.2(2\pi)$ in value, more preferably the difference is less than $0.1(2\pi)$ in value and yet more preferably the difference is less than $0.05(2\pi)$ in value. In this manner, the diffraction structure is arranged such that the diffraction structure is substantially "invisible" to the second radiation beam.

Typically in known optical systems adapted for use with multiple beams of different wavelengths by using a diffraction structure having a stepped profile, the optical system is designed to be optimised for the beam of the shortest wavelength and such that the diffraction structure is substantially "invisible" to the beam of the shortest wavelength, since it is at this wavelength that the strictest tolerances apply. However, in the present invention this is not the case, and yet in embodiments of the invention, an effective diffraction structure, which is of a relatively simple design is therefore relatively easy to manufacture, is still provided. This provides for a relatively efficient, yet relatively low cost optical scanning device.

In accordance with another aspect of the present invention, there is provided an optical system for introducing first, second and third, different, wavefront modifications into at least part of first, second and third, radiation beams, respectively, each said radiation beam having a different predetermined wavelength, the wavelength of said third radiation beam being shorter than the wavelength of both said first and said second radiation beam, wherein said optical system comprises a diffraction structure having a profile which varies in steps which are arranged to provide selected diffraction components in said wavefront modifications, the selected diffraction component of said first wavefront modification being a diffraction component of a non-zero order, characterised in that:

i) the diffraction structure is arranged such that the selected diffraction component of said third wavefront modification is a diffraction component of a non-zero order; and in that ii) the steps of the profile of the diffraction structure are arranged such that the selected diffraction component of said second wavefront modification is a different component of a zero order.

Typically in known optical systems adapted for use with multiple beams of different wavelengths by using a diffraction structure having a stepped profile, the optical system is designed to be optimised for the beam of the shortest wavelength and such that the diffraction structure is substantially "invisible" to the beam of the shortest wavelength, and therefore that a diffraction component of a zero order is used for the shortest wavelength, since it is at this wavelength that the strictest tolerances apply. However, in the present invention this is not the case, and yet in embodiments of the invention, an effective diffraction structure, which is of a relatively simple design is therefore relatively easy to manufacture, is still provided. This provides for a relatively efficient, yet relatively low cost optical scanning device.

Further features and advantages of the invention will become apparent from the following description of preferred embodiments of the invention, given by way of example only, which is made with reference to the accompanying drawings.

DETAILED DESCRIPTION OF THE INVENTION

Figure 1:
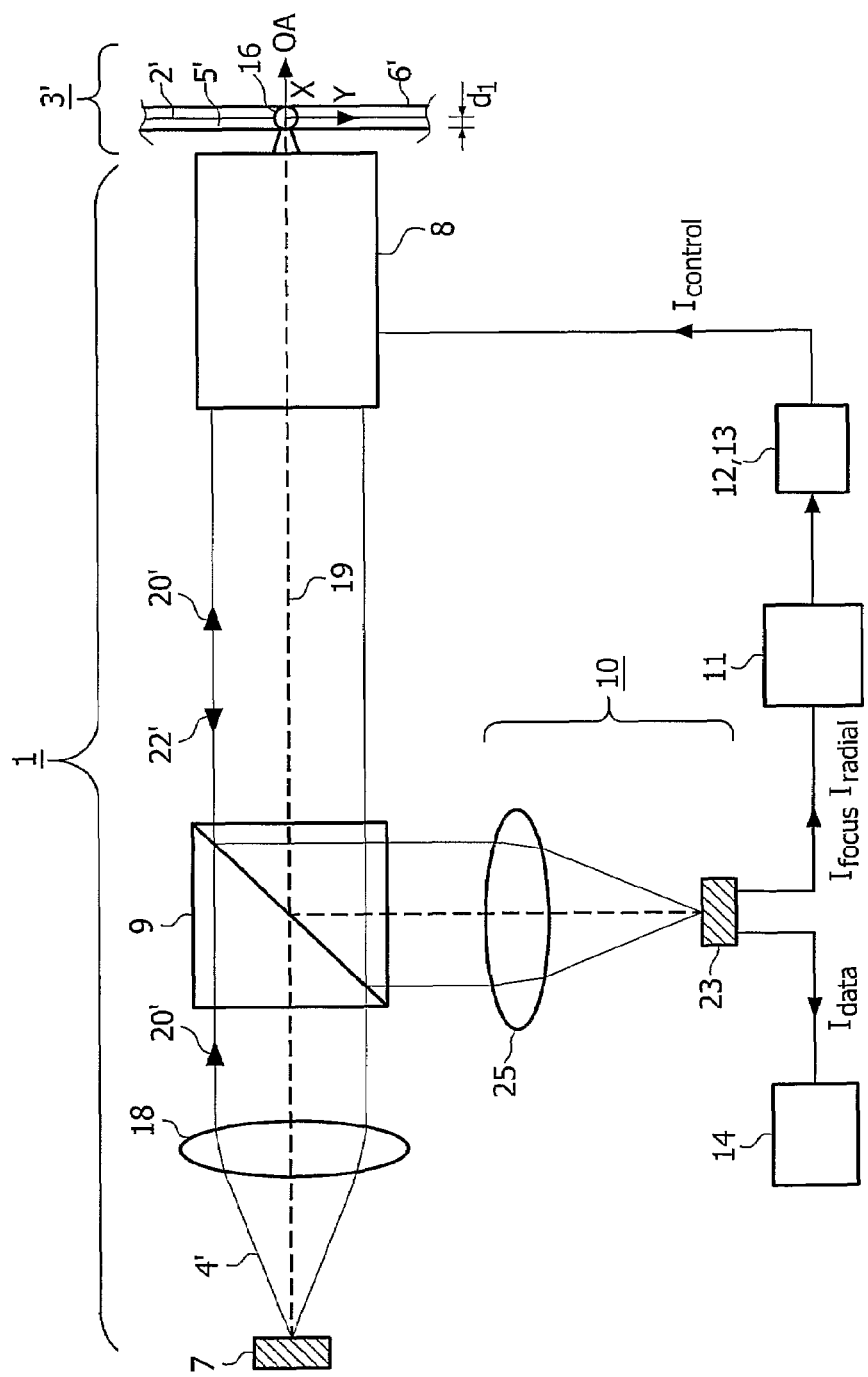
FIG. 1 shows schematically an optical scanning device in accordance with an embodiment of the present invention.

FIG. 1 shows schematically an optical scanning device for scanning a first, second and third optical record carrier with a first, second and third, different, radiation beam, respectively. The first optical record carrier 3' is illustrated and has a first information layer 2' which is scanned by means of the first radiation beam 4'. The first optical record carrier 3' includes a cover layer 5' on one side of which the first information layer 2' is arranged. The side of the information layer facing away from the cover layer 5' is protected from environmental influences by a protective layer 6'. The cover layer 5' acts as a substrate for the first optical record carrier 3' by providing mechanical support for the first information layer 2'. Alternatively, the cover layer 5' may have the sole function of protecting the first information layer 2', while the mechanical support is provided by a layer on the other side of the first information layer 2', for instance by the protective layer 6' or by an additional information layer and cover layer connected to the uppermost information layer. The first information layer 2' has a first information layer depth $d_1$ that corresponds to the thickness of the cover layer 5'. The second and third optical record carriers 3", 3'" have a second and a third, different, information layer depth $d_2$, $d_3$, respectively, corresponding to the thickness of the cover layer 5", 5'" of the second and third optical record carriers 3", 3'", respectively. The third information layer depth $d_3$ is less than the second information layer depth $d_2$ which is less than the first information layer depth $d_1$, i.e. $d3<d2<d1$. The first information layer 2' is a surface of the first optical record carrier 3'. Similarly the second and third information layers 2", 2'" are surfaces of the second and third optical record carriers 3", 3'". That surface contains at least one track, i.e. a path to be followed by the spot of a focused radiation on which path optically-readable marks are arranged to represent information. The marks may be, e.g., in the form of pits or areas with a reflection coefficient or a direction of magnetisation different from the surroundings. In the case where the first optical record carrier 3' has the shape of a disc, the following is defined with respect to a given track: the "radial direction" is the direction of a reference axis, the X-axis, between the track and the centre of the disc and the "tangential direction" is the direction of another axis, the Y-axis, that is tangential to the track and perpendicular to the X-axis. In this embodiment the first optical record carrier 3' is a compact disc (CD) and the first information layer depth $d_1$ is approximately 1.2 mm, the second optical record carrier 3" is a conventional digital versatile disc (DVD) and the second information layer depth $d_2$ is approximately 0.6 mm, and the third optical record carrier 3'" is a Blu-ray™ disc (BD) and the third information layer depth $d_3$ is approximately 0.1 mm.

As shown in FIG. 1, the optical scanning device 1 has an optical axis OA and includes a radiation source system 7, a collimator lens 18, a beam splitter 9, an optical system 8 and a detection system 10. Furthermore, the optical scanning device 1 includes a servo circuit 11, a focus actuator 12, a radial actuator 13, and an information processing unit 14 for error correction.

The radiation source system 7 is arranged for consecutively or simultaneously producing the first radiation beam 4', the second radiation beam 4" and/or the third, different, radiation beam 4'" (not shown in FIG. 1). For example, the radiation source 7 may comprise either a tunable semiconductor laser for consecutively supplying the radiation beams 4', 4", 4'" or three semiconductor lasers for simultaneously or consecutively supplying these radiation beams. The first radiation beam 4' has a first predetermined wavelength $\lambda_1$, the second radiation beam 4" has a second, different, predetermined wavelength $\lambda_2$, and the third radiation beam 4' has a third different predetermined wavelength $\lambda_3$. In this embodiment the third wavelength $\lambda_3$ is shorter than the second wavelength $\lambda_2$. The second wavelength $\lambda_2$ is shorter than the first wavelength $\lambda_1$. In this embodiment the first, second and third wavelength $\lambda_1$, $\lambda_2$, $\lambda_3$, respectively, is within the range of approximately 770 to 810 nm for $\lambda_1$, 640 to 680 nm for $\lambda_2$, 400 to 420 nm for $\lambda_3$ and preferably approximately 785 nm, 650 nm and 405 nm, respectively. The first, second and third radiation beams have a numerical aperture (NA) of approximately 0.5, 0.65 and 0.85 respectively.

The collimator lens 18 is arranged on the optical axis OA 19 for transforming the first radiation beam 4' into a first substantially collimated beam 20'. Similarly, it transforms the second and third radiation beams 4", 4'" into a second substantially collimated beam 20" and a third substantially collimated beam 20'" (not illustrated in FIG. 1).

The beam splitter 9 is arranged for transmitting the first, second and third collimated radiation beams 20', 20", 20'" toward the optical system 8. Preferably, the beam splitter 9 is formed with a plane parallel plate that is tilted with an angle α with respect to the optical axis OA and, preferably, α=45°.

The optical system 8 is arranged to focus the first, second and third collimated radiation beams 20', 20", 20'" to a desired focal point on the first, second and third optical record carriers 3', 3", 3'", respectively. The desired focal point for the first, second and third radiation beams 20', 20", 20''' is a first, second and third scanning spot 16', 16", 16''', respectively. Each scanning spot corresponds to a position on the information layer 2', 2", 2''' of the appropriate optical record carrier. Each scanning spot is preferably substantially diffraction limited and has a wave front aberration which is less than 70 mλ.

During scanning, the first optical record carrier 3' rotates on a spindle (not illustrated in FIG. 1) and the first information layer 2' is then scanned through the cover layer 5'. The focused first radiation beam 20' reflects on the first information layer 2', thereby forming a reflected first radiation beam which returns on the optical path of the forward converging focused first radiation beam provided by the optical system 8. The optical system 8 transforms the reflected first radiation beam to a reflected collimated first radiation beam 22'. The beam splitter 9 separates the forward first radiation beam 20' from the reflected first radiation beam 22' by transmitting at least a part of the reflected first radiation beam 22' towards the detection system 10.

The detection system 10 includes a convergent lens 25 and a quadrant detector 23 which are arranged for capturing said part of the reflected first radiation beam 22' and converting it to one or more electrical signals. One of the signals is an information signal $I_{data}$, the value of which represents the information scanned on the information layer 2'. The information signal $I_{data}$ is processed by the information processing unit 14 for error correction. Other signals from the detection system 10 are a focus error signal $I_{focus}$ and a radial tracking error signal $I_{radial}$. The signal $I_{focus}$ represents the axial difference in height along the optical axis OA between the first scanning spot 16' and the position of the first information layer 2'. Preferably, this signal is formed by the "astigmatic method" which is known from, inter alia, the book by G. Bouwhuis, J. Braat, A. Huijser et al, entitled "Principles of Optical Disc Systems," pp. 75-80 (Adam Hilger 1985) (ISBN 0-85274-785-3). A device for creating an astigmatism according to this focussing method is not illustrated. The radial tracking error signal $I_{radial}$ represents the distance in the XY-plane of the first information layer 2' between the first scanning spot 16' and the center of a track in the information layer 2' to be followed by the first scanning spot 16'. Preferably, this signal is formed from the "radial push-pull method" which is known from, inter alia, the book by G. Bouwhuis, pp. 70-73.

The servo circuit 11 is arranged for, in response to the signals $I_{focus}$ and $I_{radial}$, providing servo control signals $I_{control}$ for controlling the focus actuator 12 and the radial actuator 13, respectively. The focus actuator 12 controls the position of a lens of the optical system 8 along the optical axis OA, thereby controlling the position of the first scanning spot 16' such that it coincides substantially with the plane of the first information Layer 2'. The radial actuator 13 controls the position of the lens of the optical system 8 along the X-axis, thereby controlling the radial position of the first scanning spot 16' such that it coincides substantially with the centre line of the track to be followed in the first information layer 2'.

Figure 2:
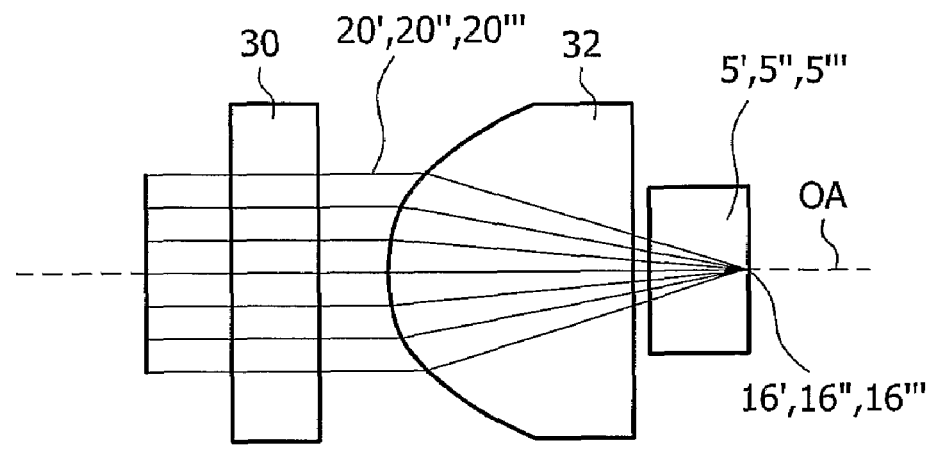
FIG. 2 shows schematically an optical system of the optical scanning device in accordance with an embodiment of the present invention.

FIG. 2 shows schematically the optical system 8 of the optical scanning device. The optical system 8, in accordance with an embodiment of the present invention, is arranged to introduce a first, second and third, different, wavefront modification $WM_1$, $WM_2$, $WM_3$, into at least part of the first, second and third radiation beams 20', 20", 20''', respectively. Each of the wavefront modifications $WM_1$, $WM_2$, $WM_3$, comprises a diffraction component and wavefront modification components of at least one of a non-diffraction adaptation component, a non-periodic phase component and a second non-periodic phase component.

The optical system 8 includes a compatibility plate 30, in this example formed preferably of COC which is a cyclic olefin copolymer, and a lens 32 which are both arranged on the optical axis OA. The lens 32 is an objective lens and has an aspherical face facing in a direction away from the optical record carrier. The lens 32 is, in this example, formed of glass. The lens 32, when operating without the compatibility plate 30, is arranged to focus a collimated radiation beam having approximately the third wavelength $\lambda_3$ and a numerical aperture (NA) of approximately 0.85 through a cover layer having the third information layer depth $d_3$ of approximately 0.1 mm to the third scanning spot 16'''.

Figure 3:
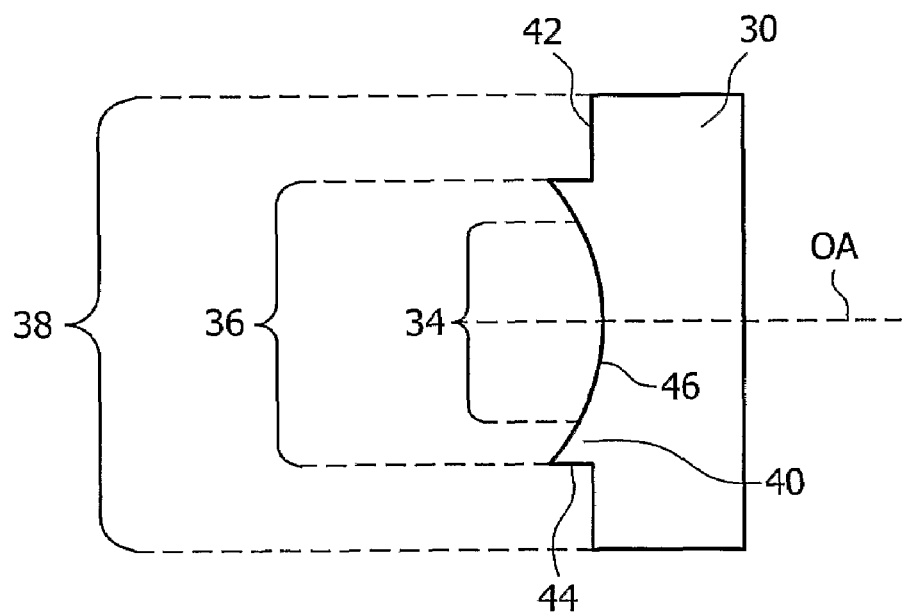
FIG. 3 shows schematically an adaptation structure in accordance with an embodiment of the present invention.

FIG. 3 shows schematically the compatibility plate 30 which has a first NA 34, a second NA 36 and a third, different, NA 38. The first, second and third MA 34, 36, 38 are approximately 0.5, 0.65 and 0.85, respectively, and correspond to the NA of the first, second and third radiation beams 4', 4", 4'''. The first, second and third NA 34, 36, 38 each have a radial extent from the optical axis OA which are, respectively, approximately 1.8 mm, 1.5 mm and 2.0 mm. The compatibility plate 30 has a planar face facing in a direction along the optical axis OA towards the optical record carrier. On an opposite side to the planar face, facing in a direction along the optical axis OA away from the optical record carrier, the compatibility plate 30 includes an adaptation structure 40. An annular region 42 lies between the third NA 38 and the second NA 36 and is planar. The adaptation structure 40 has the second NA 36 and lies at a different level of the compatibility plate 30 in relation to the annular region 42. At a boundary between the annular region 42 and the adaptation structure 40 is a wall 44. Within a region described by the wall 44 the adaptation structure 40 provides a face 46 which is substantially aspherical. A curvature of the face 46 is arranged to introduce a non-diffraction adaptation component into the first, second and third wavefront modifications $WM_1$, $WM_2$, $WM_3$. The non-diffraction adaptation component is arranged to at least partly compensate spherical aberration introduced into each radiation beam by the respective cover layers. The adaptation structure 40 is arranged such that a collimated radiation beam having approximately the second wavelength $\lambda_2$ and the second NA 36 is focused through a cover layer having the second information layer depth $d_2$ of approximately 0.6 mm to a substantially optimized second scanning spot 16" by the adaptation structure 40 and the lens 32.

Figure 4:
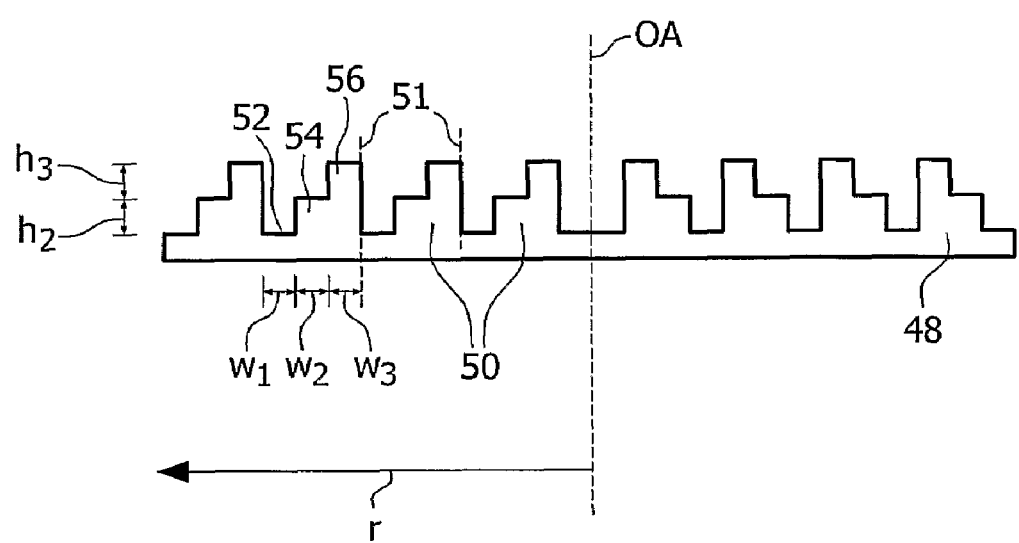
FIG. 4 shows schematically a diffraction structure in accordance with an embodiment of the present invention.

FIG. 4 shows schematically a diffraction structure of the optical scanning device. The diffraction structure is a diffraction grating 48 which has a NA of the first NA 34. The diffraction grating 48 comprises a plurality of annular protrusions 50 arranged concentrically about the optical axis OA. A boundary 51 lies between each annular protrusion 50. Each annular protrusion 50 has a stepped profile and includes a plurality of steps having different heights h. Each protrusion 50 has a first step 52 having a first step height $h_1$, a second step 54 having a second step height $h_2$ and a third step 56 having a third step height $h_3$. The first step 52, the second step 54 and the third step 56, have a first, second and third width $w_1$, $w_2$, $w_3$. The first, second and third step heights $h_1$, $h_2$, $h_3$ are arranged to introduce a diffraction component into the first, second and third wavefront modifications $WM_1$, $WM_2$, $WM_3$. The diffraction component introduced by the diffraction grating 48 is described by a phase function φ(r) where r is a radius in units of mm of the diffraction grating 48 taken in a direction perpendicular the optical axis OA. The phase function φ(r) introduced by the diffraction grating 48 is given by the polynomial relation:

$$\phi(r) = Ar^2 + Gr^4 + Hr^6 + \ldots \quad (1)$$

In the above relation, A is a coefficient of a focus of the diffractive component, G is a coefficient of a spherical aberration of the diffractive component and H is a coefficient of a higher order spherical aberration of the diffractive component. The polynomial relation may include further coefficients of a higher order spherical aberration of the diffractive component. In this embodiment the coefficients A, G, H have a value of preferably 40.000, −2.941, −1.925 respectively. It is noted that in different envisaged embodiments of the present invention, where the objective lens 32 may be different, the coefficients A, G, H may have different values. In equation 1, the polynomial relation is of an even value because the powers of $2, 4, 6 \ldots$ to which the radius r is raised are even. This ensures that the diffraction grating 48 compensates focus, spherical aberration, and higher order spherical aberrations. The phase function $\phi(r)$ may be approximated by the following relation:

$$\phi(r) = Ar^2 + Gr^4 \qquad (2)$$

Figure 5:
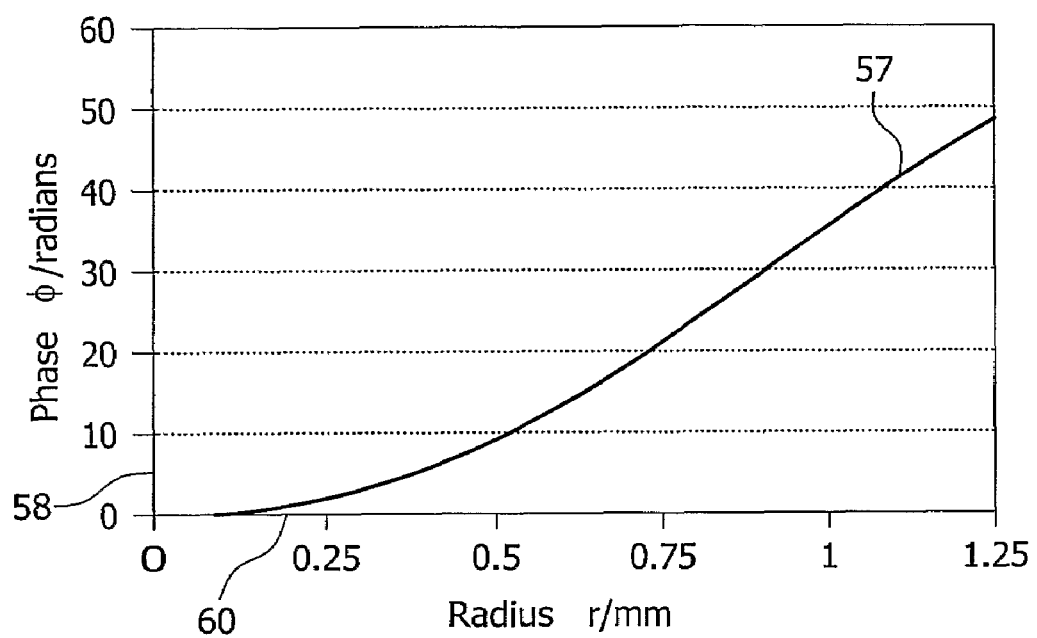
FIG. 5 shows a plot of a phase function of the diffraction structure in accordance with an embodiment of the present invention.

FIG. 5 shows a plot of the phase function $\phi(r)$ of the diffraction grating 48. The phase function $\phi(r)$ is shown by a plot line 57 which is plotted as a function of a phase 4 in units of radians on a first axis 58 against the radius r in units of mm on a second axis 60 which is perpendicular the first axis 58. The phase function $\phi(r)$ is a non-linear function. Referring to FIGS. 4 and 5, and applying the phase function $\phi(r)$ to the diffraction grating 48 as schematically illustrated in FIG. 4, each main boundary 51 between the protrusions 50 lies at a radius r which corresponds to a point of the phase function $\phi(r)$ where the phase $\phi$ has changed by approximately $2\pi$ since the previous main boundary. A boundary between the first step 52 and the second step 54 lies at a radius r which corresponds to a point of the phase function $\phi(r)$ where the phase $\phi$ has changed by approximately $$\frac{2}{3}\pi$$

since the previous main boundary 51, and a boundary between the second step 54 and the third step 56 lies at a radius r which corresponds to a point of the phase function $\phi(r)$ where the phase $\phi$ has changed by approximately $$\frac{4}{3}\pi$$

since the previous main boundary 51. The positions of these step boundaries determine the first, second and third widths $w_1, w_2, w_3$.

The diffraction component, having a diffraction order m, of the first, second and third wavefront modification $WM_1$, $WM_2$, $WM_3$ is given by the following relation:

$$W(r) = \frac{m\lambda}{2\pi}\phi(r) \qquad (3)$$

In the above relation, W is the amount of phase of the diffraction component and $\lambda$ is the wavelength of the radiation beam. The amount of phase of the diffraction component at a given radius r is proportional to a selected order m of the diffraction component. When scanning the first optical record carrier 3' with the first radiation beam 20' the diffraction grating 48 is arranged to operate at a first selected diffraction order $m_1$. When scanning the second optical record carrier 3" with the second radiation beam 20" the diffraction grating 48 is arranged to operate at a second selected diffraction order $m_2$. When scanning the third optical record carrier 3''' with the third radiation beam 20''' the diffraction grating 48 is arranged to operate at a third selected diffraction order $m_3$. The diffraction grating 48 is arranged such that the following relation holds:

$$-1 < \frac{(m_3 - m_2)}{(m_2 - m_1)} - \frac{(d_3 - d_2)}{(d_2 - d_1)} < 1 \qquad (4)$$

More preferably the diffraction grating 48 is arranged such that the following relation holds:

$$-\frac{1}{2} < \frac{(m_3 - m_2)}{(m_2 - m_1)} - \frac{(d_3 - d_2)}{(d_2 - d_1)} < \frac{1}{2} \qquad (5)$$

Even more preferably the diffraction grating 48 is arranged such that the following relation holds:

$$-\frac{1}{4} < \frac{(m_3 - m_2)}{(m_2 - m_1)} - \frac{(d_3 - d_2)}{(d_2 - d_1)} < \frac{1}{4} \qquad (6)$$

In the relation of equations 4, 5 and 6, the term:

$$\frac{(m_3 - m_2)}{(m_2 - m_1)}$$

is a first ratio between a difference of the second and third selected diffraction orders $m_2, m_3$, and a difference of the first and second selected diffraction orders $m_2, m_1$. The term:

$$\frac{(d_3 - d_2)}{(d_2 - d_1)}$$

is a second ratio between a difference of the second and third information layer depths $d_2, d_3$, and a difference of the first and second information layer depths $d_2, d_1$. The first and second ratios are preferably approximately equal, in order that the grating is capable of introducing a spherical aberration compensating component into each of the two radiation beams for which the optical system is otherwise not substantially optimised. A difference between the first ratio and the second ratio is, according to equation 4, of a value greater than −1 and less than +1. More preferably, according to equation 5 this difference is of a value greater than −½ and less than +½ and yet more preferably according to equation 6, this difference is of a value greater than −¼ and less than +¼.

In this embodiment, the first selected diffraction order $m_1$ of the diffraction component is a non-zero positive order, +1. The second selected diffraction order $m_2$ of the diffraction component is of a zeroth order, since the optical system is, in this embodiment, substantially optimised for the second wavelength $\lambda_2$ without need for a diffraction component. The third selected diffraction order $m_3$ of the diffraction component is a non-zero negative order, which is preferably of equal magnitude to the first selected diffraction order, in this example −1.

Substituting the values according to this embodiment of the first, second and third diffraction orders $m_1$, $m_2$, $m_3$ and the values of the first, second and third information layer depths $d_1$, $d_2$, $d_3$ into the central term of the relation of equations (4), (5) and (6) gives:

$$\frac{(m_3 - m_2)}{(m_2 - m_1)} - \frac{(d_3 - d_2)}{(d_2 - d_1)} = \frac{(-1-0)}{(0-1)} - \frac{(0.1-0.6)}{(0.6-1.2)} = 0.167$$

The diffraction component of each wavefront modification provided by the diffraction grating 48 includes a plurality of different diffraction orders. The first, second and third step heights $h_1$, $h_2$, $h_3$, are selected so that the diffraction grating 48 selects the first, second and third selected diffraction order $m_1$, $m_2$, $m_3$, in preference to the other diffraction orders of the plurality of different diffraction orders.

Table 1 below shows the approximate height of each of the first, second and third step heights $h_1$, $h_2$, $h_3$. Each step height h, including the first, second and third step heights $h_1$, $h_2$, $h_3$, is calculated for the second wavelength $\lambda_2$ in accordance with the following relation:

$$h = z \frac{\lambda_2}{n_2 - 1} \quad (7)$$

In the above relation, z is an integer and $n_2$ is the refractive index, for the second wavelength $\lambda_2$, of the material of the diffraction grating 48, in this example COC. Phase changes $\phi$ provided by each of the steps of the diffraction grating 48 in the first, second and third wavefront modifications $WM_1$, $WM_2$, $WM_3$ can be represented by first, second and third phase changes $\phi_1$, $\phi_2$, $\phi_3$. The first and third phase change $\phi_1$, $\phi_3$ provided for the first and third wavelengths $\lambda_1$, $\lambda_3$, respectively, by the step heights h, including the first, second and third step heights $h_1$, $h_2$, $h_3$ is calculated in accordance with the following relation:

$$\phi_k = 2\pi \frac{h(n_k - 1)}{\lambda_k} \quad (8)$$

In the above relation, k has a value of 1 or 3 for the first or third wavelength $\lambda_1$, $\lambda_3$, respectively, and $n_k$ is the refractive index of the material of the diffraction grating 48, in this example COC, for the first or the third wavelength $\lambda_1$, $\lambda_3$.

Table 1 gives the approximate value of the first, second and third phase changes $\phi_1$, $\phi_2$, $\phi_3$, modulo $2\pi$ divided by $2\pi$, provided by the first, second and third step heights $h_1$, $h_2$, $h_3$.

TABLE 1

| Step height | h [μm] | ($\phi_1$ modulo $2\pi$)/$2\pi$ | ($\phi_2$ modulo $2\pi$)/$2\pi$ | ($\phi_3$ modulo $2\pi$)/$2\pi$ |
|---|---|---|---|---|
| $h_1$ | 0.000 | 1.000 | 0 | 0.000 |
| $h_2$ | 2.487 | 0.660 | 0 | 0.349 |
| $h_3$ | 4.973 | 0.321 | 0 | 0.699 |

The first phase change $\phi_1$ is approximately $(1-a+n_{\lambda 1}) \times 2\pi$ where a is a real number having a value between 0.0 and 1.0 and $n_{\lambda 1}$ has an integer value. The second phase change $\phi_2$ is approximately $(n_{\lambda 2}) \times 2\pi$ and the third phase change $\phi_3$ is approximately $(a+n_{\lambda 3}) \times 2\pi$. The second phase change $\phi_2$, modulo $2\pi$, has a value of substantially zero. The second phase change $\phi_2$ has a value of substantially zero following subtraction of $(n_{\lambda 2}) \times 2\pi$ where $n_{\lambda 2}$ is an integer. A maximum efficiency of the diffraction grating 48 at transmitting the first, second and third radiation beams 20', 20'', 20''' is approximately at least 60%, preferably approximately 65% and more preferably approximately 68%. The stepped profile of each protrusion 50 is arranged to approximate a protrusion of a "blazed" type of diffraction grating.

Figure 6:
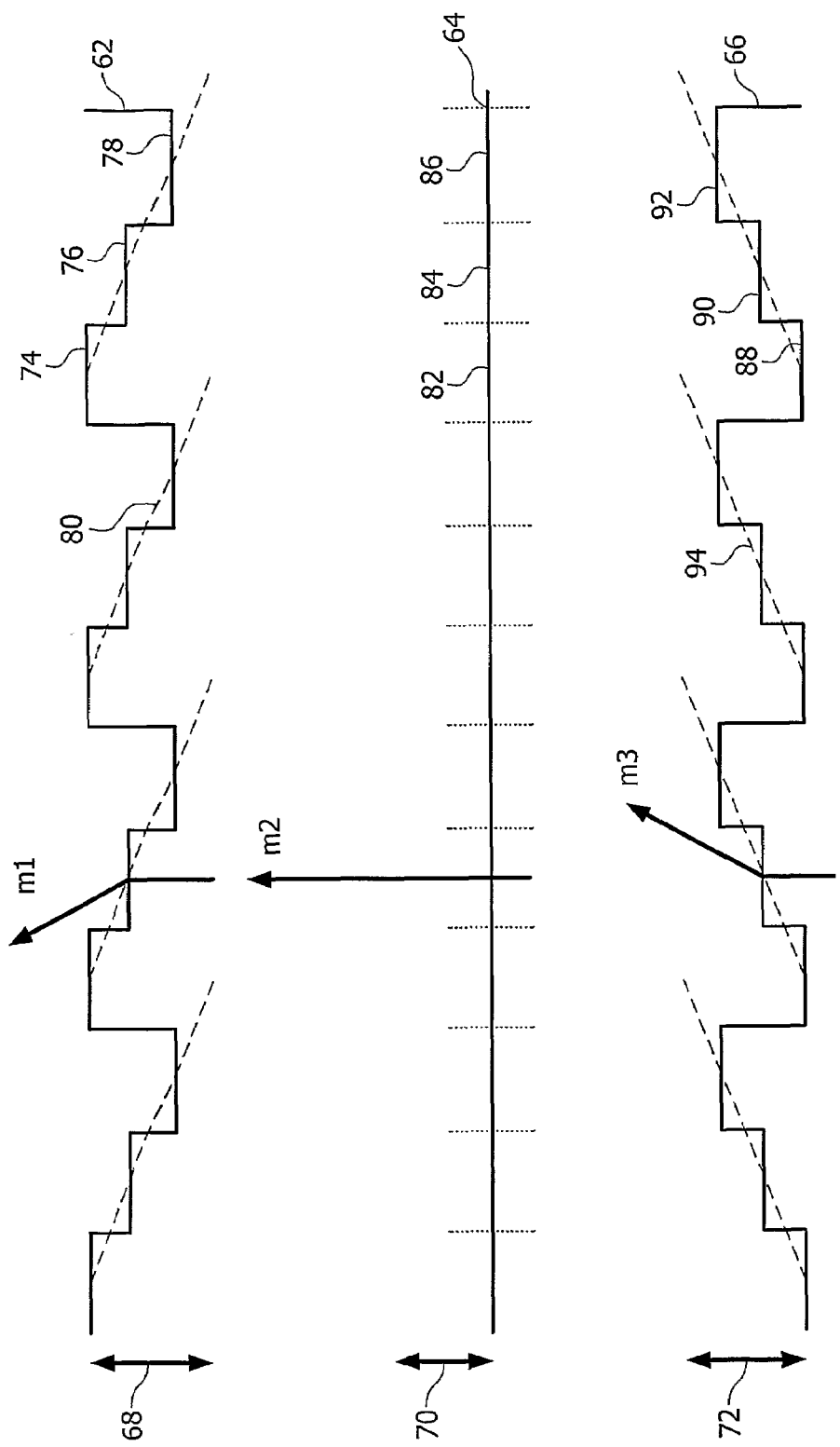
FIG. 6 shows schematically a phase delay provided by the diffraction structure for different radiation beams in accordance with an embodiment of the present invention.

FIG. 6 shows schematically a first, second and a third phase delay, modulo $2\pi$, profile 62, 64, 66 of the diffraction component provided by the diffraction grating 48 for the first, second and third wavefront modifications $WM_1$, $WM_2$, $WM_3$, respectively. A first, second and third reference arrow 68, 70, 72 indicate a length of a $2\pi$ phase for the first, second and third wavelength $\lambda_1$, $\lambda_2$, $\lambda_3$, respectively, in relation to the first, second and third phase delay profile 62, 64, 66, respectively. The first, second and third step 52, 54, 56 of the diffraction grating 48 provide for the first radiation beam 20' a first, second and third phase step 74, 76, 78, respectively, for the first phase delay profile 62. A first blaze angle line 80 indicates an angle of a blaze of each protrusion of a "blazed" type of diffraction grating which is approximated by each protrusion 50 of the diffraction grating 48 of the present invention for the first radiation beam 20'. This approximated angle by the steps of each protrusion enables the diffraction grating 48 to select the first diffraction order $m_1$ for the first radiation beam 20'.

The first, second and third step 52, 54, 56 of the diffraction grating 48 provide for the second radiation beam 20'' a first, second and third phase step 82, 84, 86, respectively, for the second phase delay profile 64. The first, second and third step heights $h_1$, $h_2$, $h_3$ enable the diffraction grating 48 to select the second diffraction order $m_2$ for the second radiation beam 20''.

The first, second and third step 52, 54, 56 of the diffraction grating 48 provide for the third radiation beam 20''' a first, second and third phase step 88, 90, 92, respectively, for the third phase delay profile 66. A different blaze angle line 94 indicates an angle of a blaze of each protrusion of a "blazed" type of diffraction grating which is approximated by each protrusion 50 of the diffraction grating 48 of the present invention for the third radiation beam 20'''. This approximated angle by the steps of each protrusion enables the diffraction grating 48 to select the third diffraction order $m_3$ for the third radiation beam 20'''.

Figure 7:
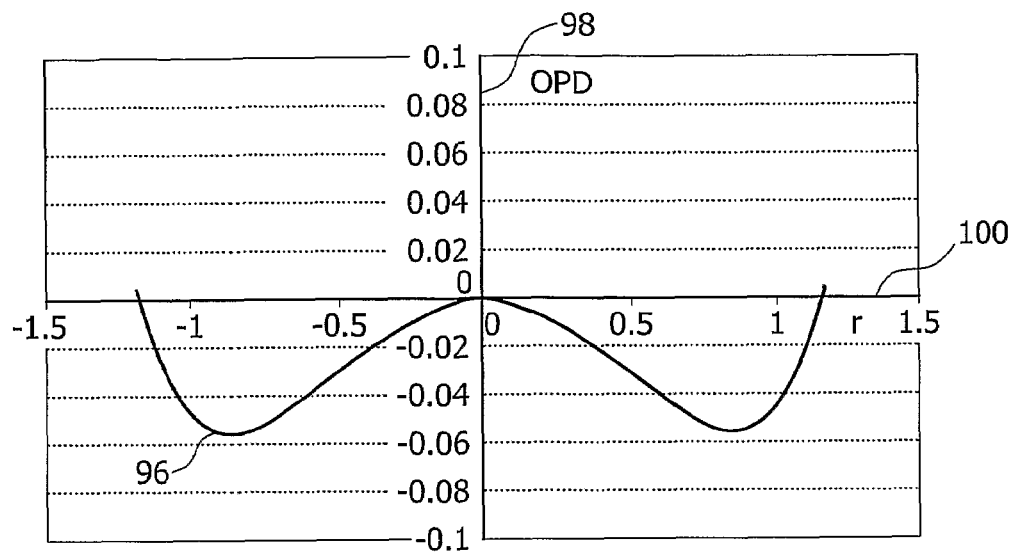
FIGS. 7, 8 and 9 each show a wavefront aberration for part of a different radiation beam provided by structures of the optical system in accordance with an embodiment of the present invention.

The diffraction grating 48 is combined with the adaptation structure 40. FIG. 7 shows a first resultant wavefront aberration 96 of the third radiation beam 20''' which is formed from the diffraction component combined with the non-diffraction adaptation component within the first NA 34. The first resultant wavefront aberration 96 of the third radiation beam 20''' is plotted on a first axis 98 against a second axis 100 which is perpendicular the first axis 98. The first axis 98 indicates an optical path difference of the wavefront aberration in waves and the second axis 100 indicates a radius r in units of mm taken in a direction perpendicular the optical axis OA. The optical path difference OPD, in this example, is defined as a difference taken between an optical path of a ray of the radiation beam entering the pupil of the optical system at a radius r of 0 and the optical path of a ray of the radiation beam entering the pupil at a radius r with a value which is not 0. A maximum optical path difference of the first resultant wavefront aberration 96 of the third radiation beam 20''' is approximately −55 mλ.

Figure 8:
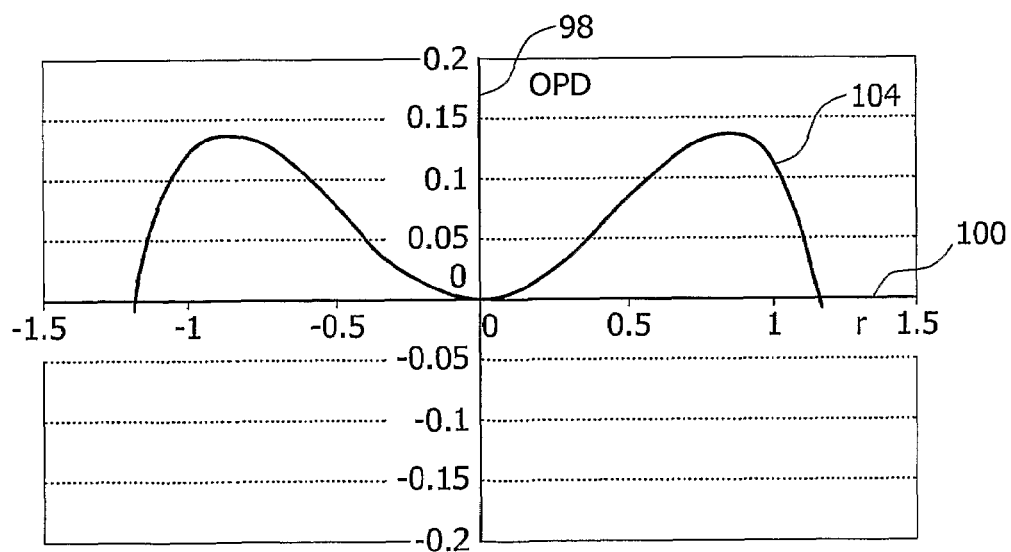

FIG. 8 shows a first resultant wavefront aberration 104 of the second radiation beam 20'' which is formed from the diffraction component combined with the non-diffraction adaptation component within the first NA 34. The first resultant wavefront aberration 104 of the second radiation beam 20'' is plotted on the first axis 98 against the second axis 100. A maximum optical path difference of the first resultant wavefront aberration 104 of the second radiation beam 20'' is approximately +138 mλ.

Figure 9:
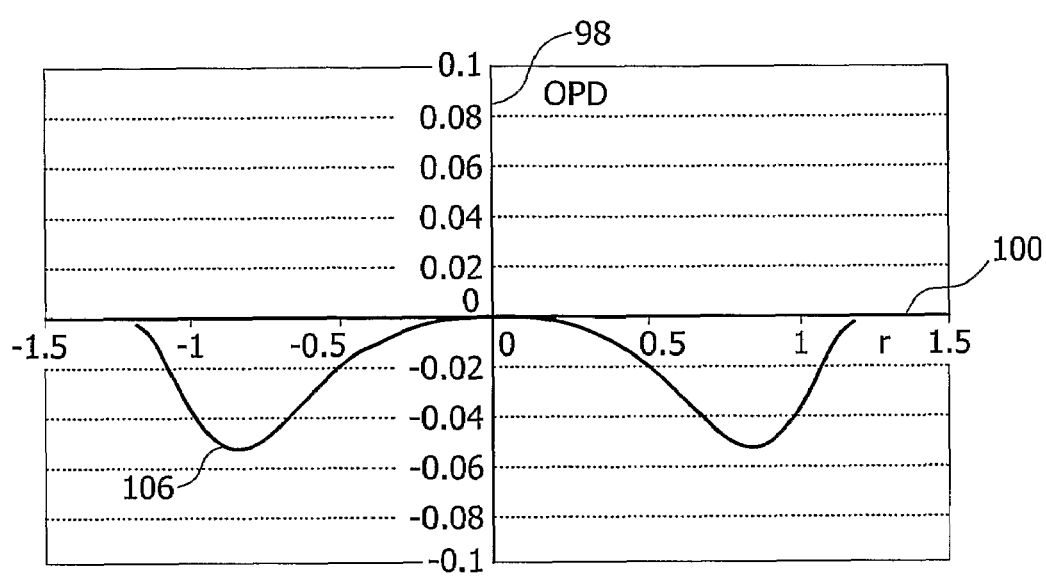

FIG. 9 shows a first resultant wavefront aberration 106 of the first radiation beam 20' which is formed from the diffraction component combined with the non-diffraction adaptation component within the first NA 34. The first resultant wavefront aberration 106 of the first radiation beam 20' is plotted on the first axis 98 against the second axis 100. A maximum optical path difference of the first resultant wavefront aberration 106 of the first radiation beam 20' is approximately −55 mλ.

Figure 10:
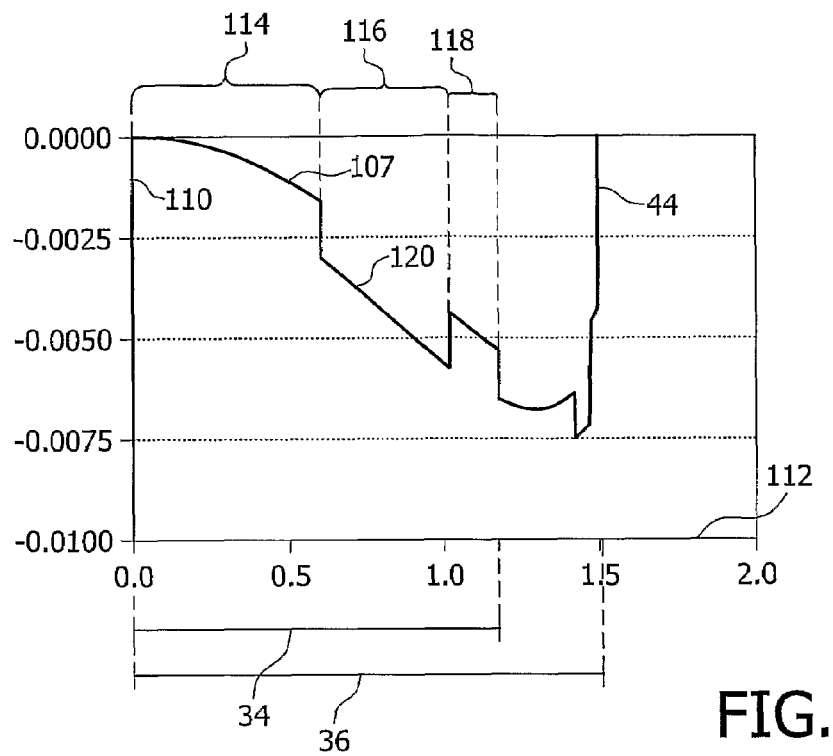
FIG. 10 shows schematically a profile of an adaptation structure combined with a non-periodic phase structure in accordance with an embodiment of the present invention.

FIG. 10 shows schematically a profile 107 of the adaptation structure 40 when combined with a non-periodic phase structure according to this embodiment. The non periodic phase structure is arranged on the aspherical face 46. The profile is plotted on a fourth axis 110 against a fifth axis 112 which is perpendicular the fourth axis 110. The first and second NAs 34, 36 having different radial extents from the optical axis OA are indicated in FIG. 10. The fourth axis 110 indicates a sag in units of mm of the combined non-periodic phase structure and the adaptation structure 40. The fifth axis 112 indicates the radius 7' in units of mm of the combined non-periodic phase structure and the adaptation structure 40. The wall 44 of the adaptation structure 40 is indicated. The non-periodic phase structure has a NA of the first NA 34.

The non-periodic phase structure comprises a plurality of radial zones which are arranged concentrically about the optical axis OA. The plurality of radial zones includes a first radial zone 114, a second radial zone 116 and a third radial zone 118. A boundary between the first radial zone 114 and the second radial zone 116 lies at a radius r of approximately 0.60 mm. A boundary between the second radial zone 116 and the third radial zone 118 lies at a radius r of approximately 1.03 mm. The second radial zone 116 of the non-periodic phase structure comprises an annular protrusion 120 which is concentric with the optical axis OA and has a sag of approximately −1.4 μm.

The non-periodic phase structure is arranged to introduce a different non-periodic phase component into the first, second and third wavefront modifications $WM_1$, $WM_2$, $WM_3$. The non-periodic phase component is arranged to subtract a phase $\phi$ from each radiation beam. For the first radiation beam 20', this phase $\phi$ modulo $2\pi$ divided by $2\pi$ has a value of approximately 0.93. For the second radiation beam 20'', this phase $\phi$ modulo $2\pi$, divided by $2\pi$ has a value of approximately 0.12. For the third radiation beam 20''', this phase $\phi$ modulo $2\pi$, divided by $2\pi$ has a value of approximately 0.88.

Figure 11:
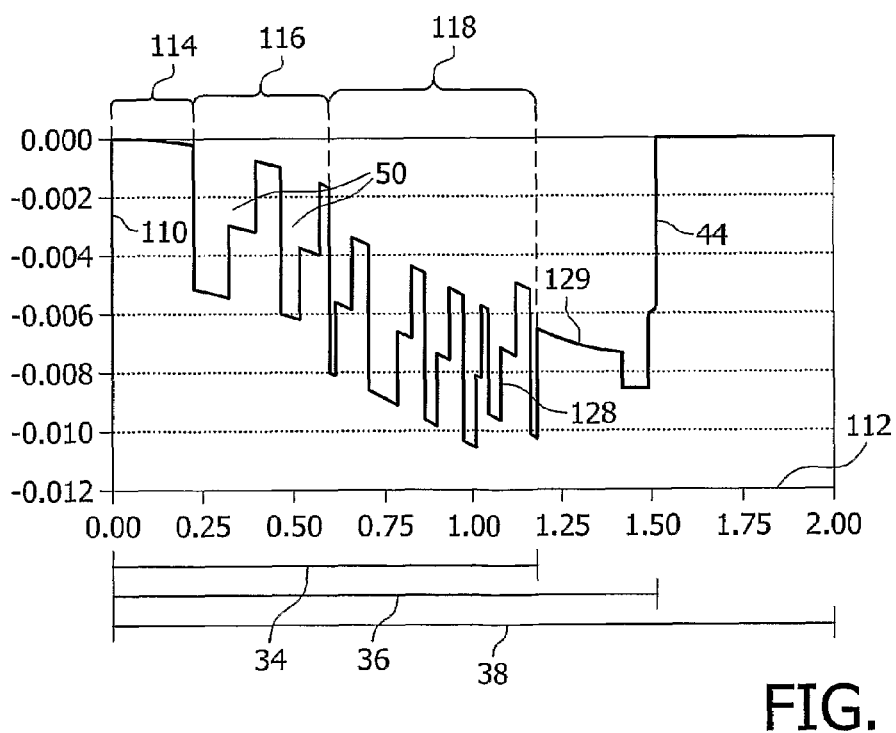
FIG. 11 shows schematically a profile of the adaptation structure combined with the non-periodic phase structure, combined with a diffraction structure in accordance with an embodiment of the present invention.

The diffraction grating 48 is combined with the non-periodic phase structure. FIG. 11 shows schematically a profile 128 of the adaptation structure 40 when combined with both the non-periodic phase structure and the diffraction grating 48. The profile 128 is plotted on the fourth axis 110 against the fifth axis 112. The first, second and third NA 34, 36, 38 having different radial extents from the optical axis OA are indicated. The first, second and third radial zones 114, 116, 118 of the non-periodic phase structure are indicated. Elements of the diffraction grating 48, the adaptation structure 40 and the non-periodic phase structure are indicated in FIG. 11 using the appropriate reference numerals.

Figure 12:
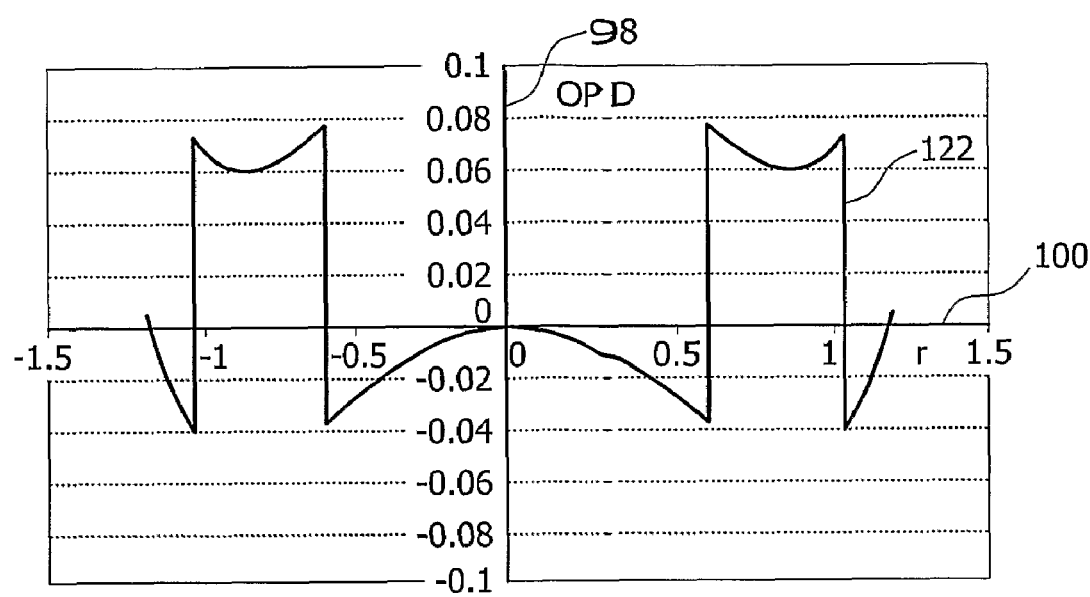
FIGS. 12, 13 and 14 each show a wavefront aberration for part of a different radiation beam provided by structures of the optical system in accordance with an embodiment of the present invention.

FIG. 12 shows a second resultant wavefront aberration 122 of the third radiation beam 20''' which is formed from the diffraction component combined with both the non-diffraction adaptation component and the non-periodic phase component within the first NA 34. The second resultant wavefront aberration 122 of the third radiation beam 20''' is plotted on the first axis 98 against the second axis 100. A root mean square wavefront aberration of the second resultant wavefront aberration 122 of the third radiation beam 20''' is approximately 37 mλ.

Figure 13:
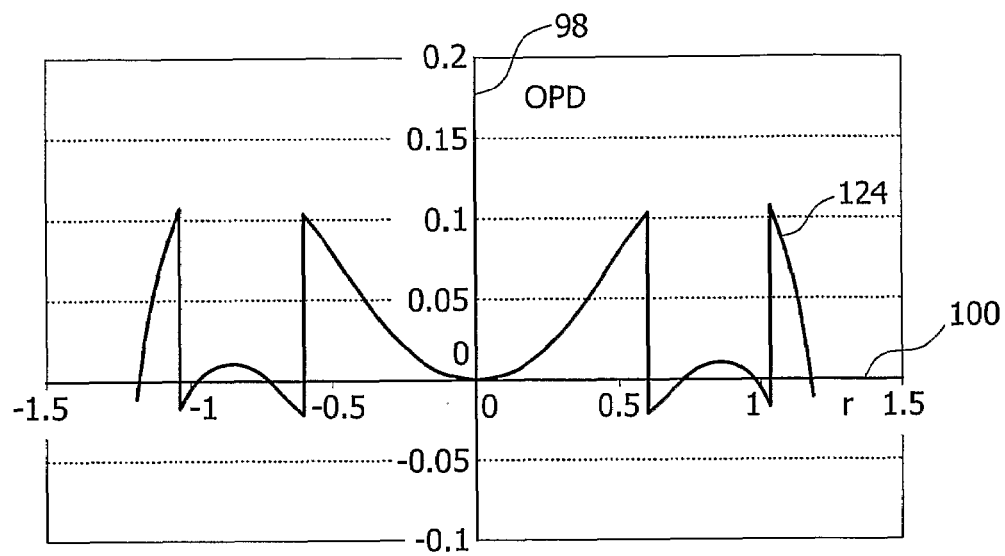

FIG. 13 shows a second resultant wavefront aberration 124 of the second radiation beam 20'' which is formed from the diffraction component combined with both the non-diffraction adaptation component and the non-periodic phase component within the first NA 34. The second resultant wavefront aberration 124 of the second radiation beam 20'' is plotted on the first axis 98 against the second axis 100. A root mean square wavefront aberration of the second resultant wavefront aberration 124 of the second radiation beam 20'' is approximately 25 mλ.

Figure 14:
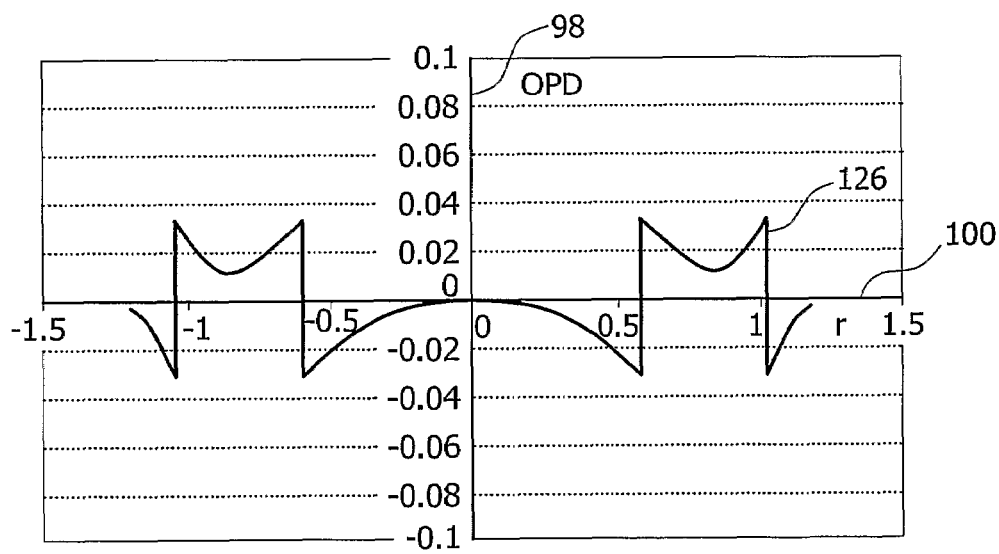

FIG. 14 shows a second resultant wavefront aberration 126 of the first radiation beam 20' which is formed from the diffraction component combined with both the non-diffraction adaptation component and the non-periodic phase component within the first NA 34. The second resultant wavefront aberration 126 of the first radiation beam 20' is plotted on the first axis 98 against the second axis 100. A root mean square wavefront aberration of the second resultant wavefront aberration 126 of the first radiation beam 20' is approximately 13 mλ.

Referring to FIG. 11, a region of the adaptation structure 40 lying between a boundary of the first NA 34 and the second NA 36, and a boundary of the second NA 36 and the third NA 38, comprises a second, different non-periodic phase structure which is combined with the adaptation structure 40. A profile 129 of this second non-periodic phase structure is shown in FIG. 11. The second non-periodic phase structure comprises a fourth, fifth and sixth radial zone which are arranged concentrically about the optical axis OA. A boundary between the third radial zone 118 and the fourth radial zone lies at a radius r of approximately 1.18 mm. A boundary between the fourth radial zone and the fifth radial zone lies at a radius r of approximately 1.425 mm. A boundary between the fifth radial zone and the sixth radial zone lies at a radius r of approximately 1.478 mm.

The second non-periodic phase structure is arranged to introduce a second non-periodic phase component into the second and the third wavefront modification $WM_2$, $WM_3$. The second non-periodic phase component is arranged to introduce a phase change $\phi$ into the second and third radiation beams 20'', 20'''.

The fourth, fifth and sixth radial zones each comprise an annular protrusion which is concentric with the optical axis OA and has respectively a fourth, fifth and sixth height $h_4$, $h_5$, $h_6$. Table 2 gives the approximate value of these heights and the phase change $\phi_3$ modulo $2\pi$ divided by $2\pi$, provided by these step heights for the third radiation beam 20'''. The fourth, fifth and sixth step heights $h_4$, $h_5$, $h_6$, provide a phase change $\phi_2$, modulo $2\pi$ divided by $2\pi$ having a value of substantially zero for the second radiation beam 20''.

TABLE 2

| Step height | h [µm] | ($\phi_2$ modulo $2\pi$)/$2\pi$ | ($\phi_3$ modulo $2\pi$)/$2\pi$ |
|---|---|---|---|
| $h_4$ | 1.243 | 0 | 0.675 |
| $h_5$ | 2.487 | 0 | 0.349 |
| $h_6$ | 0.000 | 0 | 0 |

Figure 15:
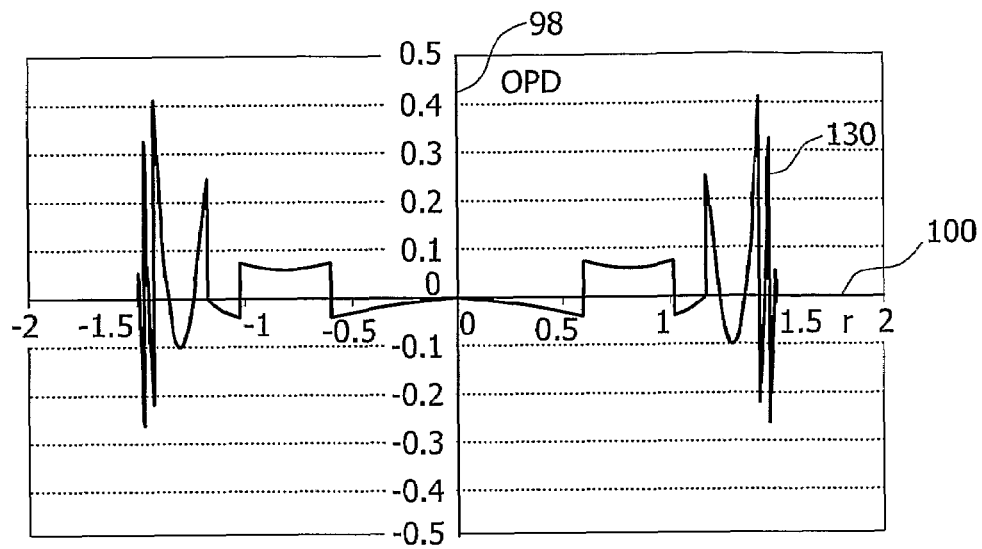
FIGS. 15, 16 and 17 each show a wavefront aberration of a different radiation beam provided by elements of the optical system in accordance with an embodiment of the present invention.

FIG. 15 shows a third resultant wavefront aberration 130 of the third radiation beam 20''' which is formed from the diffraction component combined with the non-diffraction adaptation component, the non-periodic phase component, the second non-periodic phase component and a wavefront modification component introduced by the planar annular region 42 within the third NA 38. The third resultant wavefront aberration 130 of the third radiation beam 20''' is plotted on the first axis 98 against the second axis 100. A root mean square wavefront aberration of the third resultant wavefront aberration 130 of the third radiation beam 20''' is approximately 15 mλ.

Figure 16:
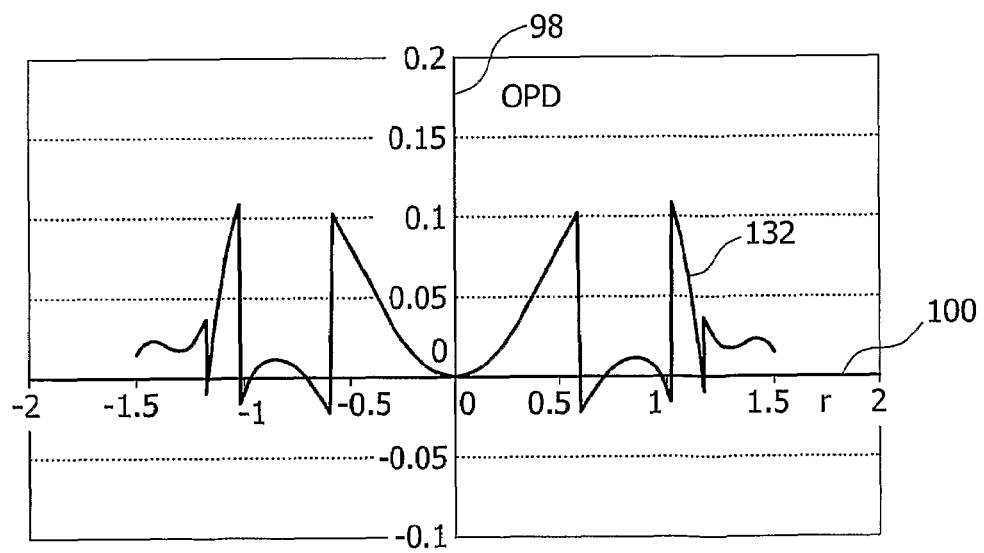

FIG. 16 shows a third resultant wavefront aberration 132 of the second radiation beam 20'' which is formed from the diffraction component combined with the non-diffraction adaptation component, the non-periodic phase component and the second non-periodic phase component within the second NA 36. The third resultant wavefront aberration 132 of the second radiation beam 20'' is plotted on the first axis 98 against the second axis 100. A root mean square wavefront aberration of the third resultant wavefront aberration 132 of the second radiation beam 20'' is approximately 18 mλ.

Figure 17:
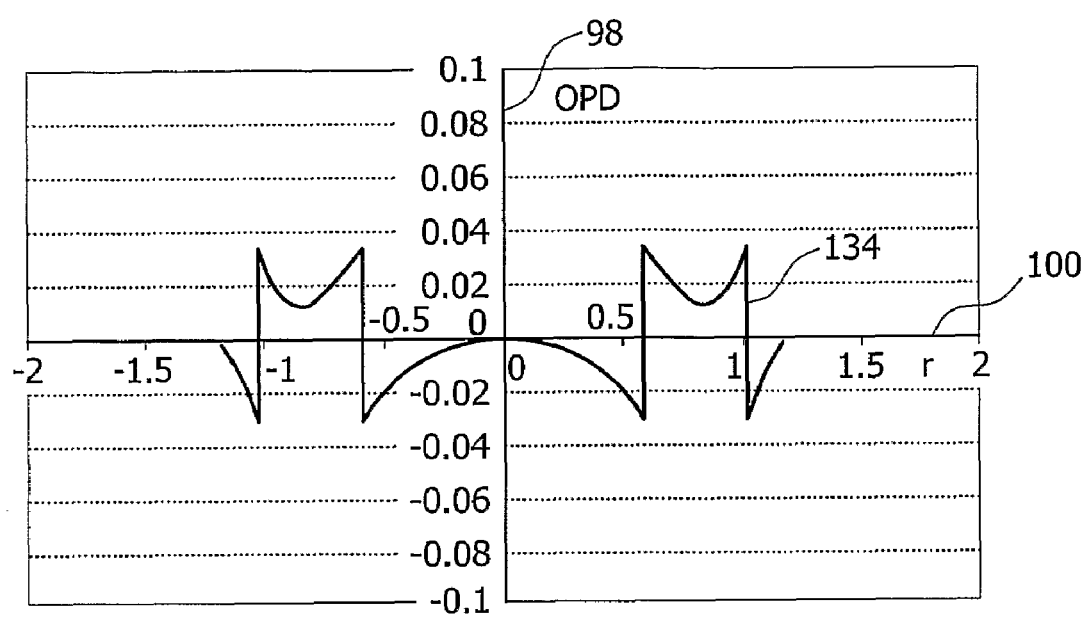

FIG. 17 shows a third resultant wavefront aberration 134 of the first radiation beam 20' which is formed from the diffraction component combined with the non-diffraction adaptation component, and the non-periodic phase component within the first NA 34. The third resultant wavefront aberration 134 of the first radiation beam 20' is plotted on the first axis 98 against the second axis 100. A root mean square wavefront aberration of the third resultant wavefront aberration 134 of the first radiation beam 20' is approximately 13 mλ.

The above embodiment is understood to be an illustrative example of the invention. Further embodiments of the invention are envisaged.

The compatibility plate which has the adaptation structure, combined with the diffraction grating, the non-periodic phase structure and the second non-periodic phase structure, is for example, formed using an injection moulding technique from the material COC. It is envisaged that the compatibility plate of the optical system may alternatively be formed from different materials which allow the requisite design of the diffraction grating, the adaptation structure, non-periodic phase structure and the second non-periodic phase structure to be achieved. It is envisaged that the compatibility plate may alternatively be formed from Diacryl. It is further envisaged that the lens or the compatibility plate may be formed from a desired material using a replication process. In this process, the desired material, in a curable form, is placed between a glass surface and a mould having a shape which corresponds to a desired shape of the compatibility plate. The material, having adopted the desired shape from the mould is then cured using, for example ultraviolet radiation.

In the described embodiment the diffraction grating is combined with the adaptation structure, the non-periodic phase structure and the second non-periodic phase structure as part of the compatibility plate. It is further envisaged that at least one of the diffraction structure, the adaptation structure, the non-periodic phase structure and the second non-periodic phase structure is alternatively combined with the lens. It is further envisaged that the diffraction structure, the adaptation structure, the non-periodic phase structure and the second non-periodic phase structure may all be combined with the lens such that the optical system does not require a compatibility plate.

In this embodiment the diffraction grating is arranged such that the first selected diffraction order $m_1$ is a non-zero positive order of +1, the second selected diffraction order $m_2$ is a zeroth order and the third selected diffraction order $m_3$ is a non-zero negative order of −1. It is further envisaged that the diffraction grating may be arranged to select different diffraction orders whilst ensuring that the relation of equation 4, 5 or 6 is held. Table 3 indicates different envisaged embodiments having different selected diffraction orders for the cover layer thicknesses of the described embodiment.

TABLE 3

| | Cover layer thickness [mm] | | |
|---|---|---|---|
| | 1.2 | 0.6 | 0.1 |
| Current embodiment selected orders | +1 | 0 | −1 |
| Envisaged embodiment 1 selected orders | −2 | −1 | 0 |
| Envisaged embodiment 2 selected orders | 0 | +1 | +2 |
| Envisaged embodiment 3 selected orders | 0 | +2 | +4 |

In the embodiment described of the present invention the diffraction grating is arranged to introduce phase changes which are, modulo $2\pi$, substantially equal to each other, into the second radiation beam. It is envisaged that the diffraction structure could alternatively be arranged to introduce similar phase changes which are, modulo $2\pi$, substantially equal to each other, into the first or the third radiation beam.

The different radiation beams of the described embodiment each have a predetermined wavelength and a certain NA. It is envisaged that radiation beams may be used having a different predetermined wavelength or a different NA. It is further envisaged that the diffraction structure, the adaptation structure, the non-periodic phase structure and/or the second non-periodic phase structure may have a different NA.

In the embodiment described the optical scanning device is arranged to scan optical record carriers having different cover layer thicknesses. It is envisaged that the optical scanning device may alternatively be arranged to scan different optical record carrier formats having different cover layer thicknesses to those of the embodiment described, whilst maintaining the relation of equation 4, 5 or 6.

In the embodiment described, the optical system comprises a second non-periodic phase structure. In further envisaged embodiments the second non-periodic phase structure may alternatively be a diffraction structure which is arranged to introduce a second diffractive component into the second and the third wavefront modification $WM_2$, $WM_3$. In the embodiment described, the optical system comprises a planar annular region 42. It is further envisaged that this region may also include an adaptation structure, a diffraction structure or a non-periodic phase structure.

In the described embodiment, certain dimensions which include step heights, widths and rates of curvature of at least one of the diffraction grating, the adaptation structure, the non-periodic phase structure and the second non-periodic phase structure are given. It is further envisaged that any of these dimensions may be different in further embodiments of the present invention.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An optical scanning device for scanning optical record carriers having information layers at different information layer depths within the carrier, the optical record carriers including a first optical record carrier having an information layer at a first information layer depth $d_1$, a second optical record carrier having an information layer at a second information layer depth $d_2$ and a third optical record carrier having an information layer at a third information layer depth $d_3$, wherein $d_3 < d_2 < d_1$, the scanning device including a radiation source system for producing first, second and third radiation beams, for scanning said first, second and third record carriers, respectively, the device including a diffraction structure introducing first, second and third, different, wavefront modifications into at least part of the first, second and third, radiation beams, respectively, the diffraction structure being arranged to operate at selected diffraction orders $m_1$, $m_2$, $m_3$, for the first, second and third radiation beams, respectively, wherein at least one of the selected diffraction orders $m_1$, $m_2$, $m_3$ is negative, and wherein the diffraction structure is arranged such that the following relation holds:

$$-1 < \frac{(m_3 - m_2)}{(m_2 - m_1)} - \frac{(d_3 - d_2)}{(d_2 - d_1)} < 1.$$

2. The optical scanning device according to claim 1, wherein the diffraction structure is arranged such that the following relation holds:

$$-\frac{1}{2} < \frac{(m_3 - m_2)}{(m_2 - m_1)} - \frac{(d_3 - d_2)}{(d_2 - d_1)} < \frac{1}{2}.$$

3. The optical scanning device according to claim 1, wherein said optical scanning device has an optical axis and said diffraction structure comprises a plurality of annular protrusions arranged concentrically about said optical axis.

4. The optical scanning device according to claim 1, wherein each said protrusion has a stepped profile, each protrusion including a plurality of steps having different heights.

5. The optical scanning device according to claim 1, wherein said optical scanning device comprises an adaptation structure arranged to introduce a non-diffraction adaptation component into each radiation beam, wherein said adaptation component is arranged to introduce spherical aberration.

6. The optical scanning device according to claim 5, wherein said adaptation structure provides a face which is substantially aspherical.

7. The optical scanning device according to claim 5, wherein said diffraction structure is combined with said adaptation structure.

8. The optical scanning device according to claim 1, wherein said optical scanning device has an optical axis and comprises a non-periodic phase structure arranged to introduce a non-periodic phase component into each radiation beam, wherein said non-periodic phase structure comprises a plurality of radial zones arranged concentrically about said optical axis and having a non-periodic radial profile.

9. The optical scanning device according to claim 8, wherein said non-periodic phase structure is combined with said diffraction structure.

10. The optical scanning device according to claim 1, wherein the selected diffraction order $m_1$ for the first radiation beam is a positive order, the selected diffraction order $m_2$ for the second radiation beam is a zeroth order and the selected diffraction order $m_3$ for the third radiation beam is a negative order.

11. The optical scanning device according to claim 1, wherein each radiation beam has a predetermined wavelength, wherein the wavelength of said third radiation beam is shorter than the wavelength of said second radiation beam and the wavelength of said second radiation beam is shorter than said first radiation beam.

12. The optical scanning device according to claim 11, wherein said predetermined wavelength of said first, second and third radiation beam is approximately 785, 650 and 405 nanometres, respectively.

13. The optical scanning device according to claim 1, wherein said first, second and third information layer depths $d_1$, $d_2$, $d_3$ are approximately 1.2, 0.6 and 0.1 millimeters, respectively.

14. An optical system for introducing first, second and third, different, wavefront modifications into at least part of first, second and third, radiation beams, respectively, each said radiation beam having a different predetermined wavelength, the wavelength of said third radiation beam being shorter than the wavelength of both said first and said second radiation beam, wherein said optical system comprises a diffraction structure having a profile which varies in steps which are arranged to provide selected diffraction components in said wavefront modifications, the selected diffraction component of said first wavefront modification being a diffraction component of a non-zero order, wherein the diffraction structure is arranged such that the selected diffraction component of said third wavefront modification is a diffraction component of a non-zero order;

wherein at least one of the selected diffraction orders is negative; and wherein the steps of the profile of the diffraction structure are arranged to introduce into said second radiation beam phase changes, each phase change, modulo $2\pi$, being substantially equal to each other phase change.

15. The optical system according to claim 14, wherein said system includes a lens for focusing each of said first, second and third radiation beams.

16. The optical system according to claim 14, wherein said optical system has an optical axis and said diffraction structure comprises a plurality of annular protrusions arranged concentrically about said optical axis.

17. The optical system according to claim 16, wherein each said protrusion has a stepped profile, each protrusion including a plurality of steps having different heights.

18. The optical scanning device according to claim 1, wherein each wavefront modification includes a non-diffraction adaptation component and said optical system comprises an adaptation structure arranged to provide said adaptation component, wherein said adaptation component is arranged to introduce spherical aberration.

19. The optical scanning device according to claim 18, wherein said adaptation structure provides a face which is substantially aspherical.

20. The optical scanning device according to claim 18, wherein said diffraction structure is combined with said adaptation structure.

21. An optical system according to claim 14, wherein each wavefront modification includes a non-periodic phase component and said optical system comprises a non-periodic phase structure arranged to provide said non-periodic phase component, wherein said non-periodic phase structure comprises a plurality of radial zones arranged concentrically about said optical axis and having a non-periodic radial profile.

22. The optical system according to claim 21, wherein said non-periodic phase structure is combined with said diffraction structure.

23. The optical system according to claim 14, wherein said diffraction component of said first wavefront modification is a diffraction component of a positive order and said diffraction component of said third wavefront modification is a diffraction component of a negative order.

24. The optical system according to claim 14, wherein the wavelength of said second radiation beam is shorter than the wavelength of said first radiation beam.

25. The optical system according to claim 24, wherein said predetermined wavelength of said first, second and third radiation beam is approximately 785, 650 and 405 nanometres, respectively.

26. An optical scanning device for scanning a first, second and third, different, optical record carrier with a first, second and third, different, radiation beam, respectively,
each radiation beam having a different predetermined wavelength, the wavelength of said third radiation beam being shorter than the wavelength of both said first and said second radiation beam,
said optical scanning device comprising an optical system according to claim 14.

27. The optical scanning device according to claim 13, wherein the optical system is arranged to focus said first, second and third radiation beams to a desired focal point on said first, second and third optical record carriers, respectively.

28. The optical scanning device according to claim 26, wherein each of said first, second and third optical record carriers have an information layer at first, second and third information layer depths $d_1$, $d_2$, $d_3$, of approximately 1.2, 0.6 and 0.1 millimeters, respectively.

29. An optical system for introducing first, second and third, different, wavefront modifications into at least part of first, second and third, radiation beams, respectively,
each said radiation beam having a different predetermined wavelength, the wavelength of said third radiation beam being shorter than the wavelength of both said first and said second radiation beam,
wherein said optical system comprises a diffraction structure having a profile which varies in steps which are arranged to provide selected diffraction components in said wavefront modifications, the selected diffraction component of said first wavefront modification being a diffraction component of a non-zero order,
wherein the diffraction structure is arranged such that the selected diffraction component of said third wavefront modification is a diffraction component of a non-zero order;
wherein at least one of the selected diffraction orders is negative, and
wherein the steps of the profile of the diffraction structure are arranged such that the selected diffraction component of said second wavefront modification is a diffraction component of a zero order.

\* \* \* \* \*